United States Patent
Pande

(10) Patent No.: US 12,455,795 B2
(45) Date of Patent: Oct. 28, 2025

(54) EFFICIENT AND SECURE FILE-LEVEL RESTORE

(71) Applicant: Dell Products L.P., Round Rock, TX (US)

(72) Inventor: Pankaj Pande, Carlingford (AU)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/625,337

(22) Filed: Apr. 3, 2024

(65) Prior Publication Data
US 2025/0315348 A1    Oct. 9, 2025

(51) Int. Cl.
*G06F 11/14* (2006.01)

(52) U.S. Cl.
CPC ...... *G06F 11/1464* (2013.01); *G06F 2201/84* (2013.01)

(58) Field of Classification Search
CPC ............. G06F 11/1469; G06F 11/1451; G06F 11/1448; G06F 11/1458; G06F 11/1464; G06F 2201/84
USPC .......... 707/640, 674, 679, 687, 695
See application file for complete search history.

(56) References Cited

U.S. PATENT DOCUMENTS

| | | | | |
|---|---|---|---|---|
| 8,099,572 B1* | 1/2012 | Arora | ...................... | G06F 13/28 |
| | | | | 711/E12.013 |
| 2005/0071390 A1* | 3/2005 | Midgley | ............. | G06F 11/1451 |
| | | | | 707/999.204 |
| 2007/0198675 A1* | 8/2007 | Amanuddin | ........... | G08B 25/10 |
| | | | | 702/188 |
| 2016/0110258 A1* | 4/2016 | Haustein | ................. | G06F 16/00 |
| | | | | 707/646 |
| 2017/0300424 A1* | 10/2017 | Beaverson | .......... | G06F 16/1752 |
| 2020/0120008 A1* | 4/2020 | Deb | ....................... | H04L 43/062 |
| 2024/0296463 A1* | 9/2024 | Fox | ......................... | G06F 30/20 |

* cited by examiner

*Primary Examiner* — Phong H Nguyen
(74) *Attorney, Agent, or Firm* — Chamberlain, Hrdlicka, White, Williams & Aughtry; Aly Z. Dossa

(57) ABSTRACT

A method for restoring data on a client node in a network includes receiving, by a first node and from the client node, a restoration request for a first version of a requested data asset; querying, by the first node, a distributed hash table (DHT) to identify a second node in a plurality of nodes storing a second version of the requested data asset; verifying, using a distributed ledger table (DLT), that the second version of the requested data asset stored on the second node matches the first version; and initiating, based on the verifying, a data transfer of the second version of the requested data asset from the second node to the client node.

18 Claims, 11 Drawing Sheets

EFFICIENT AND SECURE FILE-LEVEL RESTORE

BACKGROUND

In a computing environment, centralized data restoration solutions are commonly used, but have long restoration times and increased latencies. Data transmissions of large volumes of data across wide-area networks are costly, slow, and vulnerable to security breaches. Implementing a centralized backup and recovery system and eliminating the need for centralized servers by making use of distributed ledger technology and edge computing may allow for more reliable data restoration.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
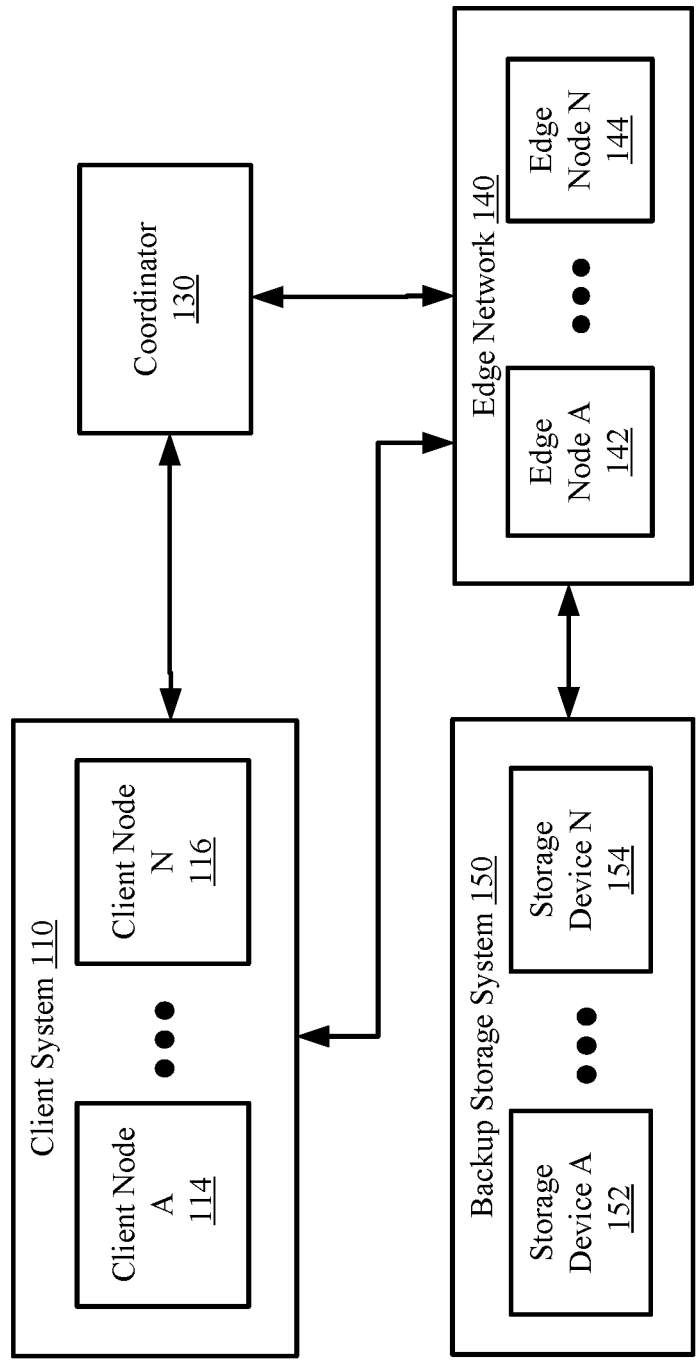
FIG. 1A shows a diagram of a system including a client system and an edge network in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regards to any other figure. For brevity, descriptions of these components will not be repeated with regards to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of the figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to system and methods for data restoration using a decentralized backup and recovery system. This system utilizes distributed ledger technology, edge computing, and advanced security protocols to enable efficient, secure, and reliable data restoration across a range of assets including files, virtual machines (VM), volumes, and logical unit numbers (LUN). One or more embodiments improve upon traditional methods of data restoration, which may traditionally include relying on a centralized system architecture. By using a plurality of edge nodes and distributed ledger technology to process data restoration requests, the embodiments disclosed herein approve upon the centralized architecture by removing the reliance on singular servers for restoration processes. The decentralized architecture disclosed herein decreases restoration time, increases data security, and improves overall system efficiency.

In one or more embodiments of the invention, distributed hash and ledger tables are continuously updated to reflect the storage locations of all data assets on a system across a plurality of client and edge nodes. New entries in the table are generated for new data asset backups and are reflected across versions of the tables on all nodes, so that every node in the system is aware of the location of all data assets at all times. Restoration requests from nodes in the system are distributed across the edge nodes in an edge network, where the locations and identity of the data assets are verified by the hash and ledger tables as well. If the edge nodes on the edge network are overwhelmed, a coordinator on the system may include functionality to redistribute the storage of data assets in the network and update the table entries accordingly. The tables are periodically checked to ensure that all versions of the data assets across all nodes are consistent. If any inconsistencies are detected between nodes, the inconsistent data assets are updated to reflect the most recent version of the data asset according to the immutable ledger table.

FIG. 1A shows a diagram of a system in accordance with one or more embodiments of the invention. The system may include a client system (110), a coordinator (130), an edge network (140), and a backup storage system (150). The system may include additional, fewer, and/or other components without departing from the invention. Each of the components in the system may be operatively connected via any combination of wireless and/or wired networks.

In one or more embodiments, the client system (110) may include a plurality of client nodes (114, 116) without departing from the scope of the invention. The client nodes (114, 116) on a client system (110) may all be related by common control of a business or company. In one or more embodiments, the client nodes (114, 116) in a client system (110) are decentralized and serve as both service consumers and service providers. The client nodes (114, 116) may include functionality to both initiate backup requests, initiate restoration requests, and store backup assets. Examples of client nodes (114, 116) may include, but are not limited to, personal computers such as desktops, laptops, and tablets, virtual or physical servers, etc. Additional details on the client nodes (114, 116) may be found, for example, in FIGS. 1B, 3A-3C, and 4.

In one or more embodiments, the coordinator (130) manages all data processing requests between the client system (110) and the edge network (140). The coordinator (130) includes the functionality to update and maintain the distributed ledger table (DLT) (136, FIG. 1C, and 146, FIG. 1D) and the distributed hash table (DHT) (138, FIG. 1C, and 148, FIG. 1D). These tables may be managed such that they are consistent and distributed throughout the nodes (142, 144) so that all nodes in the system can trust the integrity of the data assets being backed up, transferred, and restored. Additional details on the coordinator (130) may be found, for example, in FIGS. 1C, 3A, 3C, and 4.

In one or more embodiments, the coordinator (130) is implemented as a computing device. A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device it causes the computing device to perform the functionality of a coordinator (130) as described throughout this application.

In one or more embodiments of the invention, the coordinator (130) is implemented as a logical device. The logical device may utilize the computing resources of any number of computing devices and thereby provide the functionality of the coordinator (130) as described throughout this application.

In one or more embodiments, the edge network (140) may be a data architecture, which may include a plurality of edge nodes (142, 144). An edge network (140) may be implemented on a system with the intention of storing and restoring data. A plurality of edge nodes (142, 144) may exist on the edge network (140). The edge nodes (142, 144) may be geographically close to the client nodes (114, 116) in the client system (110), than, for example, a central server, and may store frequently accessed backup assets for easy access. The edge nodes may include the functionality to predictively cache frequently accessed data assets, discussed at length in FIG. 1D. Examples of an edge node may include, but are not limited to, a smartphone, a laptop, a tablet, a sensor, a server, a router, a WAN access device, etc. An edge node is not limited to the aforementioned examples and may be another type of device without departing from the scope of the invention.

Figure 5:
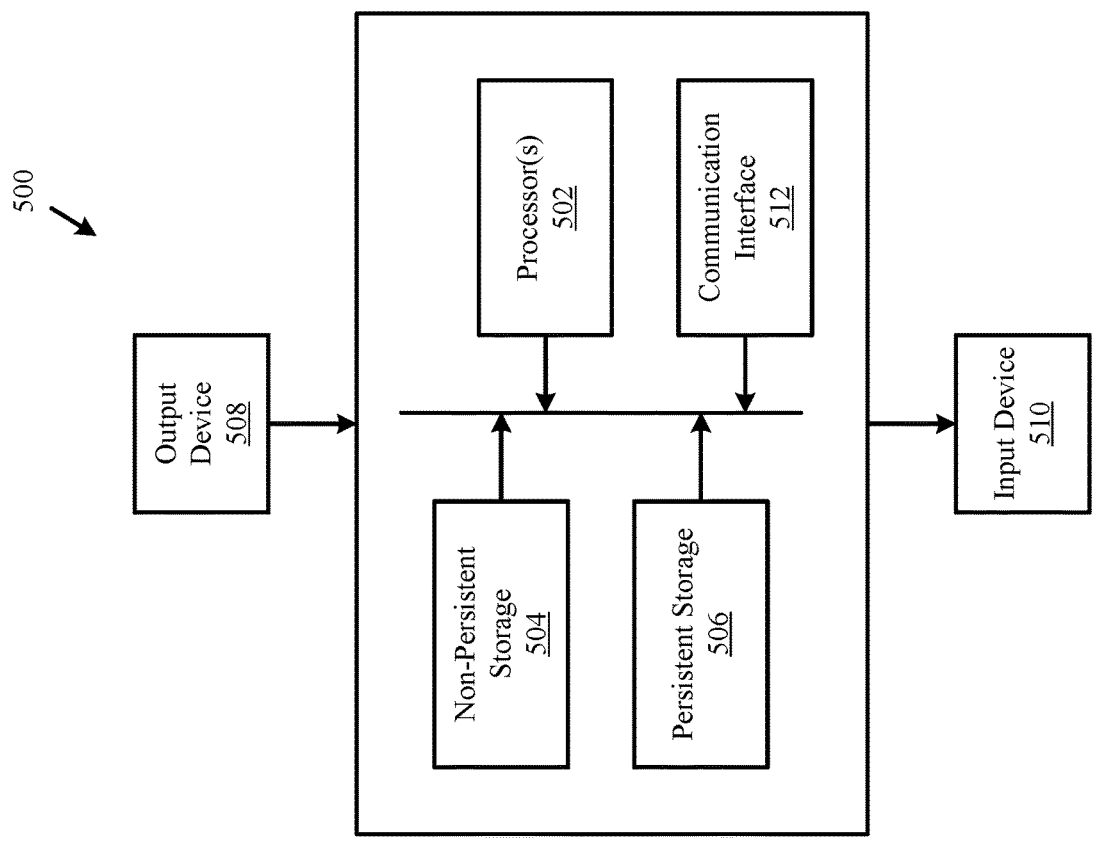
FIG. 5 shows a diagram of a computing device in accordance with one or more embodiments of the invention.

In one or more embodiments, each edge node (142, 144) is implemented as a computing device (see e.g., FIG. 5). The computing device may be, for example, a mobile phone, tablet computer, laptop computer, desktop computer, server, router, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, it will cause the computing device to perform the functionality of the edge nodes (142, 144) as described throughout this application. Additional details for the functionality of an individual edge node (142, 144) may be found, for example, in FIG. 1D.

In one or more embodiments, the backup storage system (150) may include a plurality of storage devices (152, 154) without departing from the scope of the invention. In the context if this invention, the backup storage system (150) serves as a failsafe in the event that data restoration requests cannot be conducted on the decentralized client system (110) and edge network (140). Said another way, the backup storage system (150) may service backup and restoration requests as an additional option to the servicing of such requests by the other nodes (e.g., 142, 144) in the system. The storage devices (152, 154) may include the functionality to provide and/or obtain other services without departing from the invention. The backup storage system (150) may include any number of storage devices (152, 154) without departing from the invention.

In one or more embodiments of the invention, the backup storage system (150) is implemented as a computing device. A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device it causes the computing device to perform the functionality of a storage system (150) as described throughout this application.

In one or more embodiments of the invention, the backup storage system (150) is implemented as a logical device. The logical device may utilize the computing resources of any number of computing devices and thereby provide the functionality of the backup storage system (150) as described throughout this application.

Figure 1B:
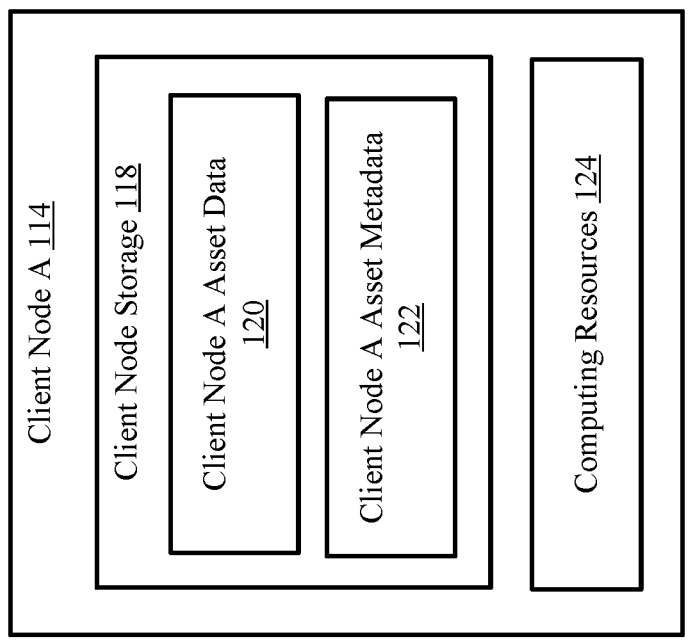
FIG. 1B shows a diagram of a client node in accordance with one or more embodiments of the invention.

Turning now to FIG. 1B, FIG. 1B shows a diagram of a client node (114) in accordance with one or more embodiments of the invention. The client node of FIG. 1B may be an embodiment of a client node (114, 116, FIG. 1A) discussed above. The client node may include client node storage (118) and computing resources (124). The client node (114) may include additional, fewer, and/or different components without departing from the invention. Each of the aforementioned components of the client node (114) is discussed below.

In one or more embodiments of the invention, each client node (114) is implemented as a computing device. A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device it causes the computing device to perform the functionality of a client node (114,) as described throughout this application.

In one or more embodiments of the invention, each client node (114) is implemented as a logical device. The logical device may utilize the computing resources of any number of computing devices and thereby provide the functionality of a client node (114) as described throughout this application.

In one or more embodiments, the client node storage (118) may include client node asset data (120) and client node asset metadata (122). The client node storage (118) may include additional, fewer, and/or different components without departing from the invention. Each of the aforementioned components of the client node storage (118) is discussed below.

In one or more embodiments, client node asset data (120) may refer to the data of assets stored on the client nodes (114). Since a client node may be any number of computing or logical devices as described above, there may be multiple data types stored on the client node. Client node asset data (120) may include, but is not limited to, files, file systems, documents, and databases. Client node asset data (120) may be transmitted to edge nodes (142, 144, FIG. 1A, 142, FIG. 1D) in accordance with the methodology described in FIGS. 3A and 3B. It may include asset data created by the client node (114) itself, or assets obtained through data operation requests from a plurality of edge nodes (142, 144) in the edge network (140), as shown in FIG. 1.

In one or more embodiments, client node asset metadata (122) may refer to information that describes the client node asset data (120). Client node asset metadata (122) may include, but is not limited to, descriptive information about the asset itself (e.g., asset identifiers, timestamps, etc.), information about previous operations that the asset has gone through, and information about how many computing resources will be required to process the data. The client node asset metadata (122) may be included in the DLT, discussed at length below in FIG. 2A.

In one or more embodiments, computing resources (124) for the client node (114) may refer to hardware or software elements of the client node (114) that may be available or unavailable to perform tasks. Computing resources (124) may include, but are not limited to, resources such as volatile storage, persistent storage, central processing unit (CPU) usage, graphics processing unit (GPU) usage, power, and networking interfaces. The computing resources (124) available to each client node (114) may be dependent on the workload on the client node (114) at any given time. Workload metrics (134, FIG. 1C), generated based on the usage of the computing resources (124), are provided to and stored by the coordinator (130, FIGS. 1A, 1C) and may assist in the reallocation of data processing requests and/or of client node asset data (120). Additional information on the workload metrics is discussed below in FIG. 1C.

Figure 1C:
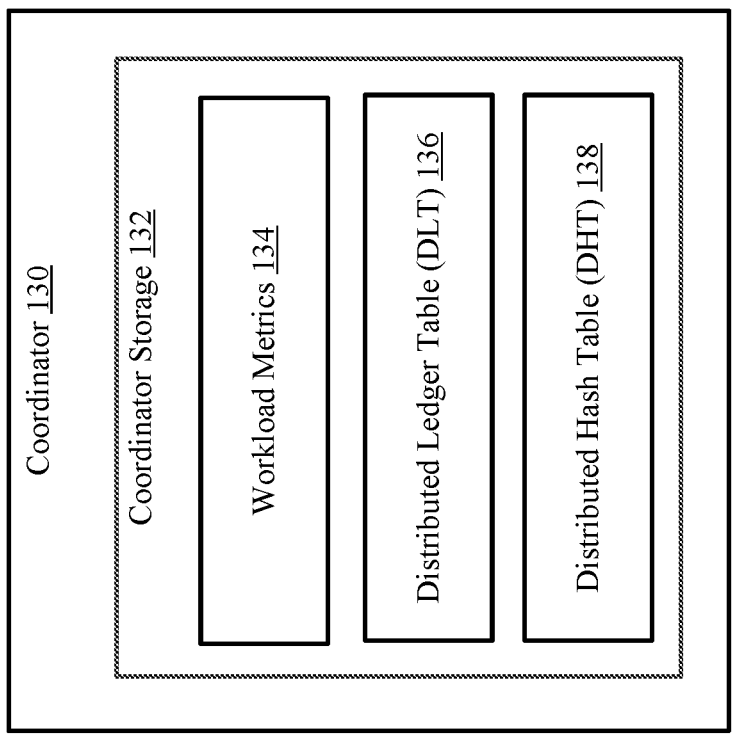
FIG. 1C shows a diagram of a coordinator in accordance with one or more embodiments of the invention.

Turning now to FIG. 1C, FIG. 1C shows a diagram of a coordinator (130) in accordance with one or more embodiments of the invention. The coordinator of FIG. 1C may be an embodiment of a coordinator (130, FIG. 1A) discussed above. The coordinator may include coordinator storage (132). The coordinator (130) may include additional, fewer, and/or different components without departing from the invention. Each of the aforementioned components of the coordinator (130) is discussed below.

In one or more embodiments, the coordinator storage (132) may include workload metrics (134), the distributed ledger table (DLT) (136), and the distributed hash table (DHT) (138). The coordinator storage (132) may include additional, fewer, and/or different components without departing from the invention. Each of the aforementioned components of the coordinator storage (132) is discussed below.

In one or more embodiments, the workload metrics (134) may include information on the workloads of each node (114, 116, 142, 144, FIG. 1A) in the system. The workload metrics (134) may include information on the allocation of usage of computing resources (124, FIG. 1B, 150, FIG. 1D) by the client and edge nodes in the system. Maintaining a history of workload metrics (134) may be used to improve restoration times and reduce latency. By continuously monitoring and collecting data on the workload in the system, the coordinator (130) is able to analyze such data to detect patterns in the historical access of data. Detecting patterns in past data operations may allow for the coordinator (130) to better predict when, where, and what data assets will be requested in the future, and by which nodes. By predicting future data processing requests, the coordinator (130) may reallocate the storage of data to edge nodes (142, 144) that are geographically closer to client nodes (114, 116) that are predicted to request the data. Data operation requests between nodes (114, 116, 142, 144) that are geographically close to each other have shorter restoration times than those that are further apart.

In one or more embodiments, the DLT (136) and DHT (138) refer to two data structures used by the coordinator (132) in order to locate and verify the location and identity of an asset on the system during a restoration process. The DLT (136) includes metadata for all assets on all nodes in the system, and the DHT (138) keeps a record of the location of each version of assets. Additional details on the content of the DLT (136) and DHT (138) can be found in FIGS. 2A and 2B, respectively.

Figure 1D:
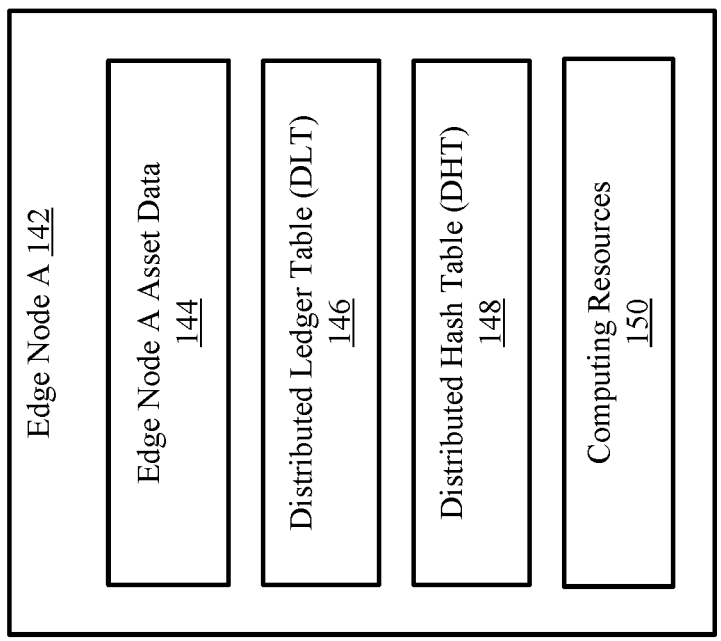
FIG. 1D shows a diagram of an edge node in accordance with one or more embodiments of the invention.

Turning now to FIG. 1D, FIG. 1D shows a diagram of an edge node (142) in accordance with one or more embodiments of the invention. The edge node of FIG. 1D may be an embodiment of an edge node (142, FIG. 1A) discussed above. The edge node may include edge node asset data (144), the distributed ledger table (DLT) (146), and the distributed hash table (DHT) (148). The edge node (142) may include the functionality to predictively cache frequently accessed data assets in order to decrease the time required to perform a data processing request such as restoration, described in detail in FIGS. 3B and 4. The edge node (142) may include additional, fewer, and/or different components without departing from the invention. Each of the aforementioned components of the edge node (142) is discussed below.

In one or more embodiments, the edge node asset data (144) includes any data assets that may be generated or stored on an edge node (142). Edge node asset data (144) may be transmitted to requesting client nodes (114, 116, FIG. 1A, 114, FIG. 1B) in accordance with the methodology described in FIG. 3B. Since an edge node (142) may be any number of computing or logical devices as described above, there may be multiple data types stored. Edge node asset data (144) may include, but is not limited to, files, file systems, documents, and databases. It may include, but is not limited to, asset data created by the edge node (142) itself, such as data from monitoring devices, sensors, cameras, etc. Edge node asset data (144) may be relocated at any point in time by the coordinator (130, FIG. 1A, FIG. 1C) based on a workload analysis applied to workload metrics (134, FIG. 1C). For example, edge node asset data (144) from one edge node (142) may be frequently accessed by a client node (114, 116, FIG. 1A) that is closer in proximity to a different edge node on the edge network (140). The coordinator (130, FIG. 1A, FIG. 1C) may transfer the edge node asset data (144) to the edge node that is geographically closer in order to decrease latency. Since the transferred edge node data asset (144) is frequently accessed, the edge node (142) that is now the storage location of the data asset may predictively cache it for easier access. Additional information on predictive caching may be found, for example, in the example in FIG. 4.

In one or more embodiments, the DLT (146) and DHT (148) refer to two tables used by the edge node (142) in order to locate and verify the location and identity of an asset on the system. The DLT (146) includes metadata for all assets on all nodes in the system, and the DHT (148) keeps a record of the location of each version of assets. The DLT (146) and DHT (148) may be embodiments of the DLT and DHT (136, 138, FIG. 1C) discussed above. Additional details on the content of the DLT (146) and DHT (148) can be found in FIGS. 2A and 2B, respectively.

In one or more embodiments, computing resources (150) may refer to hardware or software elements of the edge node (142) that may be available or unavailable to perform tasks. Computing resources (150) may include, but are not limited to, resources such as volatile storage, persistent storage, CPU usage, GPU usage, power, and networking interfaces. The computing resources (150) available to each edge node (142) may be dependent on the workload on the device at any given time, discussed below in FIG. 3C. Workload metrics (134, FIG. 1C), generated based on the usage of the computing resources (150), are stored by the coordinator (130, FIGS. 1A, 1C) and may assist in the reallocation of data processing requests. In one or more embodiments, the edge node (142) may include the functionality to use machine-learning models to analyze historical computing resource (150) usage trends in order to predict which data assets stored on the edge node in the edge node asset data (144) are likely to be requested. This predictive caching process may also include the analysis of workload metrics (134, FIG. 1C) stored in the coordinator (130, FIGS. 1A, 1C). Additional information on the workload metrics is discussed above in FIG. 1C.

Figure 2A:
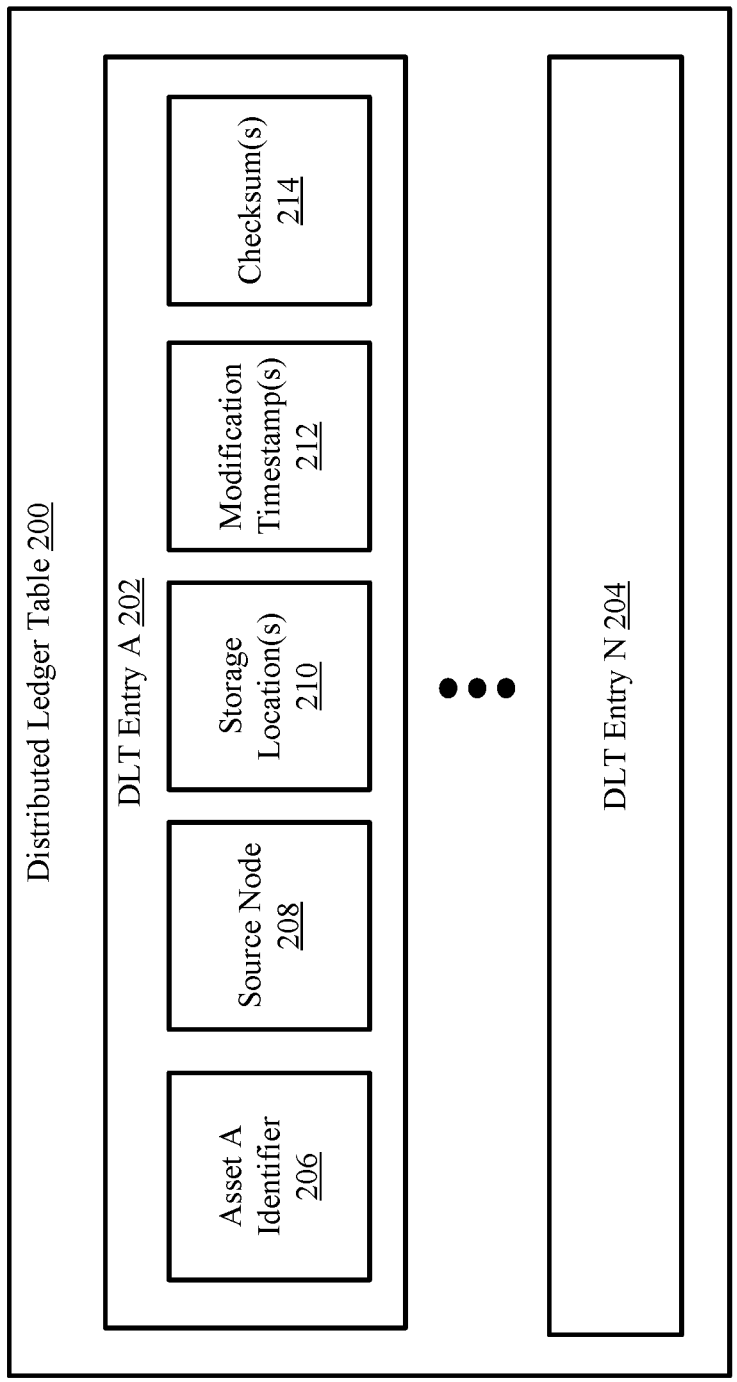
FIG. 2A shows a diagram of a distributed ledger table in accordance with one or more embodiments of the invention.

Turning now to FIG. 2A, FIG. 2A shows a diagram of a distributed ledger table (DLT) (200) in accordance with one or more embodiments of the invention. The DLT of FIG. 2A may be an embodiment of a DLT (136, 146, FIG. 1C, 1D) discussed above. The DLT (200) may include a plurality of DLT entries (202, 204). Each DLT entry (202, 204) corresponds to one data asset that originates from a singular source node (208), with all modified versions of the data asset listed in their respective storage location(s) (212). In one or more embodiments, each DLT entry (202, 204) may include metadata about a data asset such as an asset identifier (206), a source node (208), at least one storage location (210), at least one modification timestamp (212), and at least one checksum (214). The DLT (200) may include additional, fewer, and/or different components without departing from the invention. Each of the aforementioned components of a DLT entry (202, 204) in the DLT (200) is discussed below.

In one or more embodiments, the asset identifier (206) refers to an alpha, numeric, or alpha-numeric string that is used to identify the asset. An asset identifier (206) may be generated (or otherwise derived) from information associated with the asset, including type of data, date of creation, name, content, etc. For example, the various attributes of the asset may be obtained and then a hash function may be applied to these attributes in order to generate an asset identifier. The asset identifier (206) may be included in a restoration request in order to identify which data asset is desired by a node.

In one or more embodiments, the source node (208) refers to an identifier of a node on the system that originally generated or initiated the backup of the asset identified by the asset identifier (206). The source node for a data asset may be any node on the system, whether a client node (114, 116, FIG. 1A) on the client system (110, FIG. 1A) or an edge node (142, 144, FIG. 1A) on the edge network (140, FIG. 1A).

In one or more embodiments, the storage location(s) (210) refer to at least one location that a version of a data asset is stored. The storage location(s) (210) for a data asset may be any node or nodes on the system, whether a client node (114, 116, FIG. 1A) on the client system (110, FIG. 1A) or an edge node (142, 144, FIG. 1A) on the edge network (140, FIG. 1A). Different versions of a data asset may be stored on different nodes, as nodes may individually conduct data operations on versions of a data asset. However, the coordinator (130, FIG. 1A) conducts consistency checks utilizing the DLT (200) that ensure that all nodes that possess a version of an asset have the latest version of the data asset. Additional information on this process may be found, for example, in FIGS. 3A and 4.

In one or more embodiments, the modification timestamp(s) (212) indicate the last time that a version of a data asset in a storage location (210) has been modified. As discussed above, there may be multiple versions of a data asset in a plurality of storage locations. The coordinator (130, FIG. 1A) may include the functionality to consult the DLT (200) to locate the most recently updated version of the data asset, based on the modification timestamp (212), and ensure that all other nodes containing a version of the data asset have the latest version.

In one or more embodiments, the checksum(s) (214) refers to a piece of metadata for a version of a data asset that verifies data integrity. A checksum (214) may be used by the coordinator (130, FIG. 1A) to quickly determine if a data asset has been edited or tampered with. A checksum (214) includes the number of bits in a data asset, and if the number of bits is over or under the expected number, it may indicate that it is not the desired version of the data asset. The number of bits assigned in a checksum (214) may be determined after running a hash function. Edge nodes (142, 144, FIG. 1A) may include the functionality to initiate an operation such as checksum generation locally as opposed to, for example, on a centralized server. The checksums are essential in the consistency checks discussed in FIGS. 3A and 4.

Figure 2B:
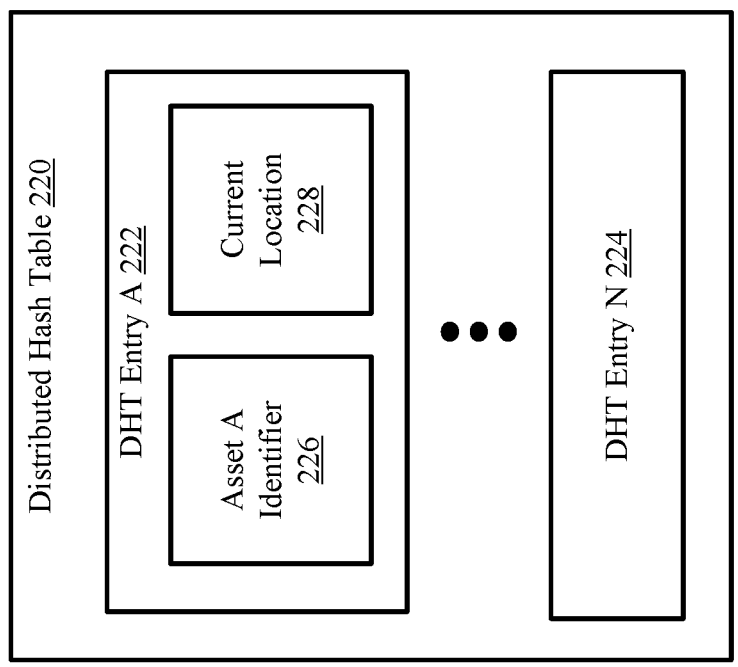
FIG. 2B shows a diagram of a distributed hash table in accordance with one or more embodiments of the invention.

Turning now to FIG. 2B, FIG. 2B shows a diagram of a distributed hash table (DHT) (220) in accordance with one or more embodiments of the invention. The DHT of FIG. 2B may be an embodiment of a DHT (138, 148, FIG. 1C, 1D) discussed above. The DHT (220) may include a plurality of DHT entries (222, 224). Each DHT entry (222, 224) corresponds to a version of a data asset, in contrast to the DLT (200, FIG. 2A) discussed above. In one or more embodiments, each DHT entry (222, 224) may include an asset identifier (226), and a current location (228). The DHT (220) may include additional, fewer, and/or different components without departing from the invention. Each of the aforementioned components of a DHT entry (222, 224) in the DHT (220) is discussed below.

In one or more embodiments, the asset identifier (226) refers to an alpha, numeric, or alpha-numeric string that is used to identify the asset. An asset identifier (226) may be generated (or otherwise derived) from information associated with the asset, including type of data, date of creation, name, content, etc. For example, the various attributes of the asset may be obtained and then a hash function may be applied to these attributes in order to generate an asset identifier. The asset identifier (226) may be included in a restoration request in order to identify which data asset is desired by a node.

In one or more embodiments, the current location (228) of a data asset in the DHT (220) refers to the node on which the requested version of the data asset is currently stored. The current location (228) is associated with the asset identifier (226), and allows the coordinator (130, FIG. 1A, 1C) to map to the location of the desired data asset during a data restoration process, as described in FIG. 3B.

Figure 3A:
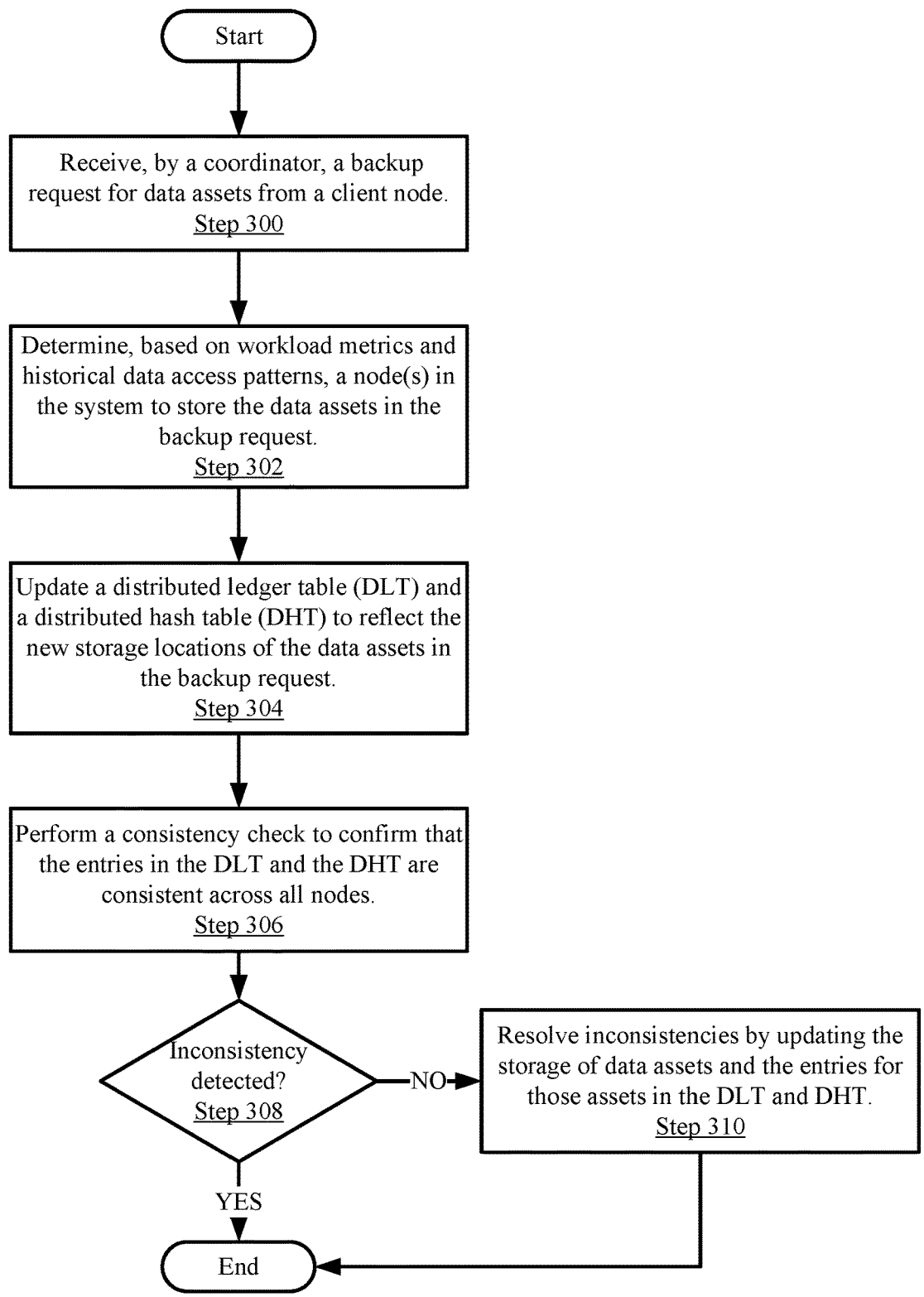
FIG. 3A shows a flowchart of a method for updating a distributed hash table and a distributed ledger table in accordance with one or more embodiments of the invention.

FIG. 3A shows a flowchart of a method for updating a DHT and a DLT in accordance with one or more embodiments of the invention. The method may be performed by, for example, the coordinator (130, FIG. 1A, FIG. 1C). Other components of the system illustrated in FIGS. 1A-1D may perform all, or a portion, of the method of FIG. 3A without departing from the invention.

While FIG. 3A is illustrated as a series of steps, any of the steps may be omitted, performed in a different order, include additional steps, and/or perform any or all of the steps in a parallel and/or partially overlapping manner without departing from the invention.

In Step 300, the coordinator receives a backup request for data assets from a client node. The backup request may specify the type of data assets included in the backup request, the amount of computing resources the backup request will require to be processed, etc.

In Step 302, at least one node in the system is determined to be a viable location to store the data assets in the backup request. Data assets may be stored on single nodes or across multiple nodes. Data assets may be, for example, logically partitioned by the coordinator with each portion stored in a different node or replicated completely across multiple nodes in the system. The node(s) are determined to be a good location for processing the backup request based on workload metrics obtained from coordinator storage as well as historical data patterns. Historical data patterns may refer to previous storage locations for similar data assets. Historical data patterns may be found, for example, in the DLT and DHT.

In Step 304, the DLT and DHT are updated to reflect the single or multiple new storage locations of the data assets. The DLT is updated with a new entry including an asset identifier for the version of the asset that was stored, the source client node that the asset originates from, a list of other storage locations for backups of the asset, a list of timestamps for modifications to versions of the asset, and checksums used to validate the identity of the asset prior to fulfilling a data operation request such as a restoration.

In Step 306, a consistency check is performed by the coordinator to confirm that the entries in the DLT and DHT across all nodes are consistent. The consistency check may compare the local data on the client and edge nodes to the checksums on the DLT to determine if there are any versions of the data assets that do not match the other versions in different storage locations.

In Step 308, a determination is made about whether or not an inconsistency has been detected on the DLT and DHT across all nodes. If an inconsistency has been detected, the method proceeds to Step 310; if an inconsistency has not been detected, the method ends following Step 308.

In Step 310, any inconsistencies on the DHT and DLT are resolved by updating the storage of data assets and the entries for those assets in the tables. In one or more embodiments, the most recently updated version of a data asset according to the modification timestamps in the DLT is replicated to other nodes that store a version of the data asset. Once all nodes that are storage locations for a version of the data asset are updated to store the most recently modified version, the method ends following Step 310.

Figure 3B:
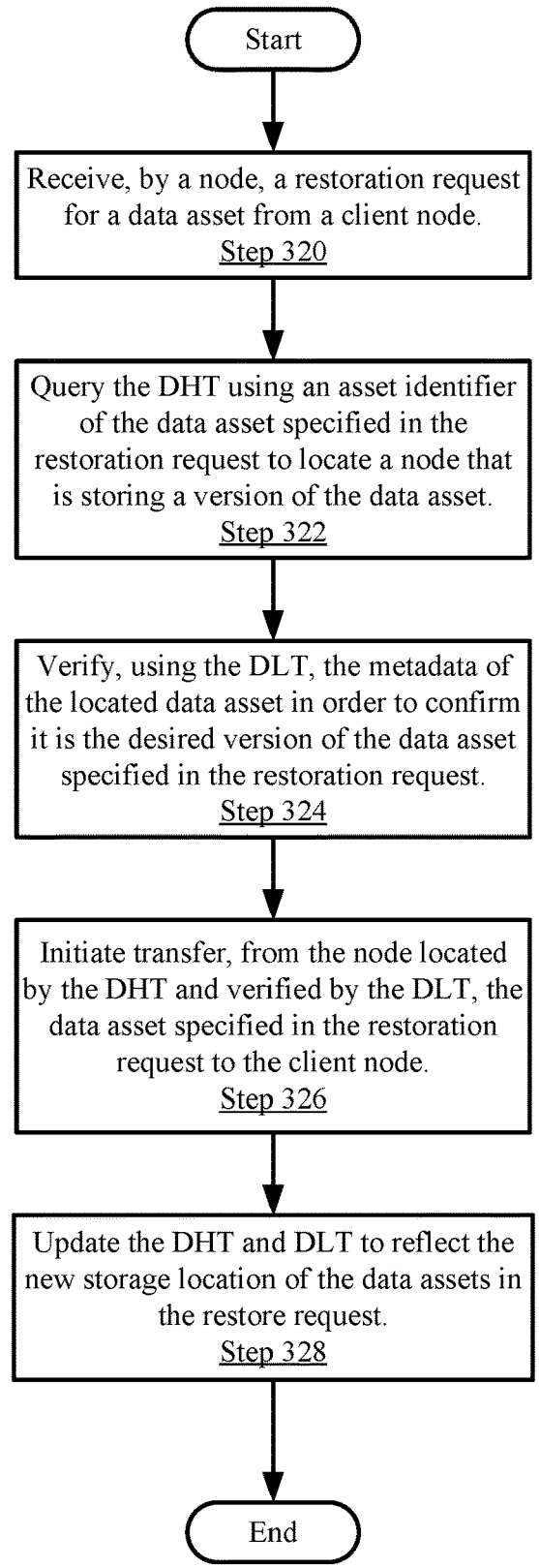
FIG. 3B shows a flowchart for processing a data restoration request in accordance with one or more embodiments of the invention.

FIG. 3B shows a flowchart of a method for processing a data restoration request in accordance with one or more embodiments of the invention. The method may be performed by, for example, a client node (114, 116, FIG. 1A, 114, FIG. 1B) or edge node (142, 144, FIG. 1A, 142, FIG. 1D). Other components of the system illustrated in FIGS. 1A-1D may perform all, or a portion, of the method of FIG. 3B without departing from the invention.

While FIG. 3B is illustrated as a series of steps, any of the steps may be omitted, performed in a different order, include additional steps, and/or perform any or all of the steps in a parallel and/or partially overlapping manner without departing from the invention.

In Step 320, a restoration request for a data asset is received by a node from a client node. The restoration request may be received by any node in the system. The restoration request includes the asset identifier of the desired data asset specified in the request.

In Step 322, the node that received the restoration request queries the DHT to locate a node on the system that is storing the requested version of the requested data asset. The DHT is queried using the asset identifier of the desired data asset specified in the restoration request. The DHT includes a current location for the data asset that is associated with the asset identifier specified in the restoration request. Though the DHT is consistently updated along with the DLT, it is not immutable, and the storage location for the data asset provided by the DHT needs to be verified.

In Step 324, the metadata of the located data asset is verified using the DLT. The metadata of the located data asset is checked against the DLT to confirm that the data asset stored in the node located in Step 322 is the desired version of the data asset specified in the restoration request. The version of the data asset located in Step 322 may be verified by the DLT using methods including, but not limited to, comparing checksums. Using checksums to verify data assets will prevent the transfer of compromised or incorrect data assets. This step ensures that the node receives a correct, updated, and secure version of the data asset requested in the restoration request.

In Step 326, the data asset specified in the restoration request is transferred from its storage location identified by the DHT in Step 322 and verified by the DLT in Step 324 to the client node that issued the restoration requestClose proximity of an edge node to the node that requested the restoration of a data asset may decrease the latency between the time of the restoration request and the time that the node that issued the request receives the data asset.

In Step 328, the DHT and DLT are updated to reflect the new storage location of the data asset in the restore request. In the DHT, the current location associated with the asset identifier of the data entry for the data asset specified in the request will be updated to reflect the new storage location in the node that issued the request. In the DLT, the node that issued the restoration request will be added as a storage location in the data entry for the data asset specified in the restore request.

Figure 3C:
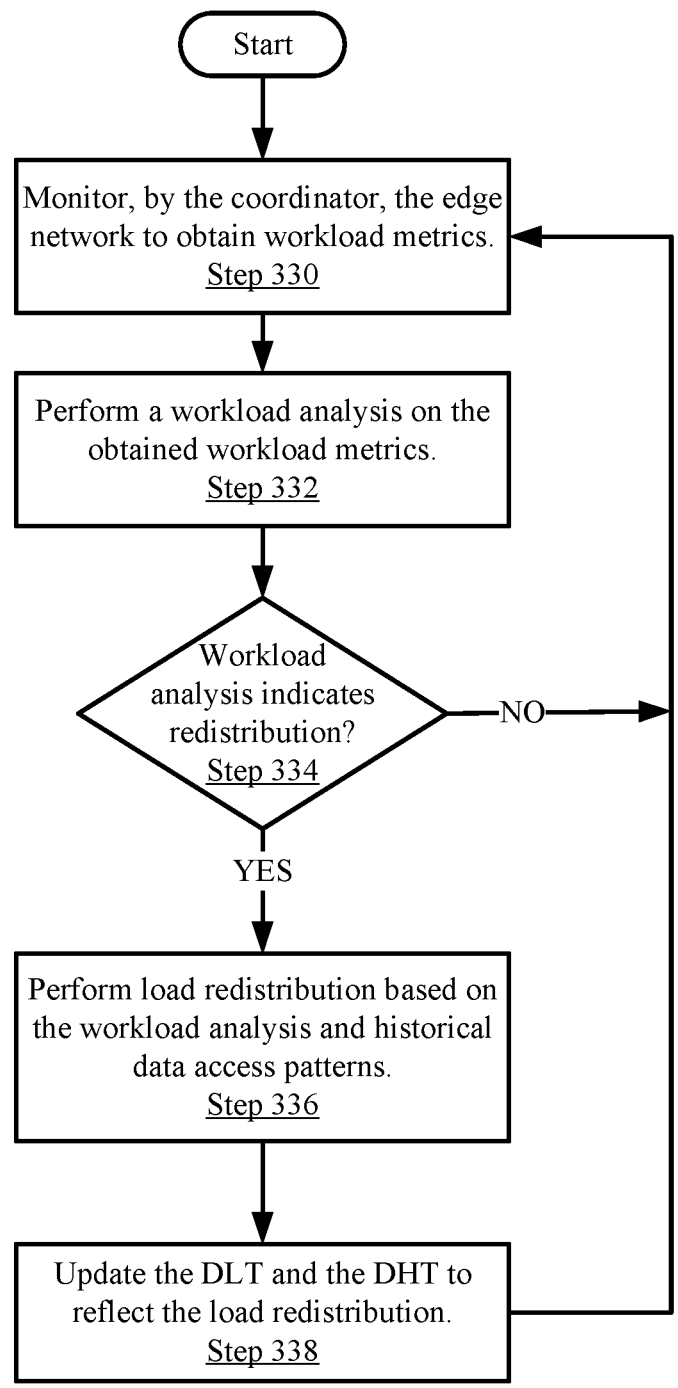
FIG. 3C shows a flowchart for a load distribution process in accordance with one or more embodiments of the invention.

FIG. 3C shows a flowchart of a method for a load distribution process in accordance with one or more embodiments of the invention. The method may be performed by, for example, the coordinator (130, FIG. 1A, FIG. 1C). Other components of the system illustrated in FIGS. 1A-1D may perform all, or a portion, of the method of FIG. 3C without departing from the invention.

While FIG. 3C is illustrated as a series of steps, any of the steps may be omitted, performed in a different order, include additional steps, and/or perform any or all of the steps in a parallel and/or partially overlapping manner without departing from the invention.

In Step 330, the edge network is continuously monitored by the coordinator in order to obtain workload metrics. Workload metrics may be obtained by analyzing the usage of computing resources by each of the edge nodes on the edge network. Computing resources may be used, for example, used by an edge node during data processing requests. While workload metrics are discussed for the edge node, the client system, for example, may also be monitored without departing from the scope of this invention.

In Step 332, a workload analysis is performed by the coordinator on the obtained workload metrics. The workload analysis may consist of identifying edge nodes on the edge network that may be overconsuming or underutilizing their computing resources. Edge nodes that are using too many computing resources may be overloaded, which would indicate a need to redistribute at least some of the workload that is being performed by that edge node. Identifying that there are edge nodes on the system that have an excess computing resources available to handle more workload may also indicate that there is a need to redistribute the workload being done on the edge network.

In Step 334, a determination is made about whether or not the workload analysis indicates redistribution of the workload on the system. If the workload analysis does not indicate redistribution, the method returns to Step 330; if the workload analysis does indicate redistribution, the method proceeds to Step 336.

In Step 336, workload redistribution is performed based on the workload analysis performed in Step 332 and historical data access patterns. As discussed in Step 332, the coordinator has analyzed which edge nodes on the edge network are overconsuming or underutilizing their respective computing resources. As the workload analysis in Step 334 has indicated a need to redistribute load on the system, the coordinator may move stored data assets from edge nodes that are overloaded (i.e., using too many computing resources) to edge nodes that have computing resources available to handle the increased load of servicing additional data processing requests for stored data assets.

In Step 338, the DLT and DHT are updated to reflect the load distribution. This update may include updating the current location(s) of data asset(s) on the DHT, and adding or removing storage location(s) for data asset(s) on the DLT. Consistency checks are periodically conducted on the DHT and DLT to ensure that all data entries are represented correctly.

Example

Figure 4:
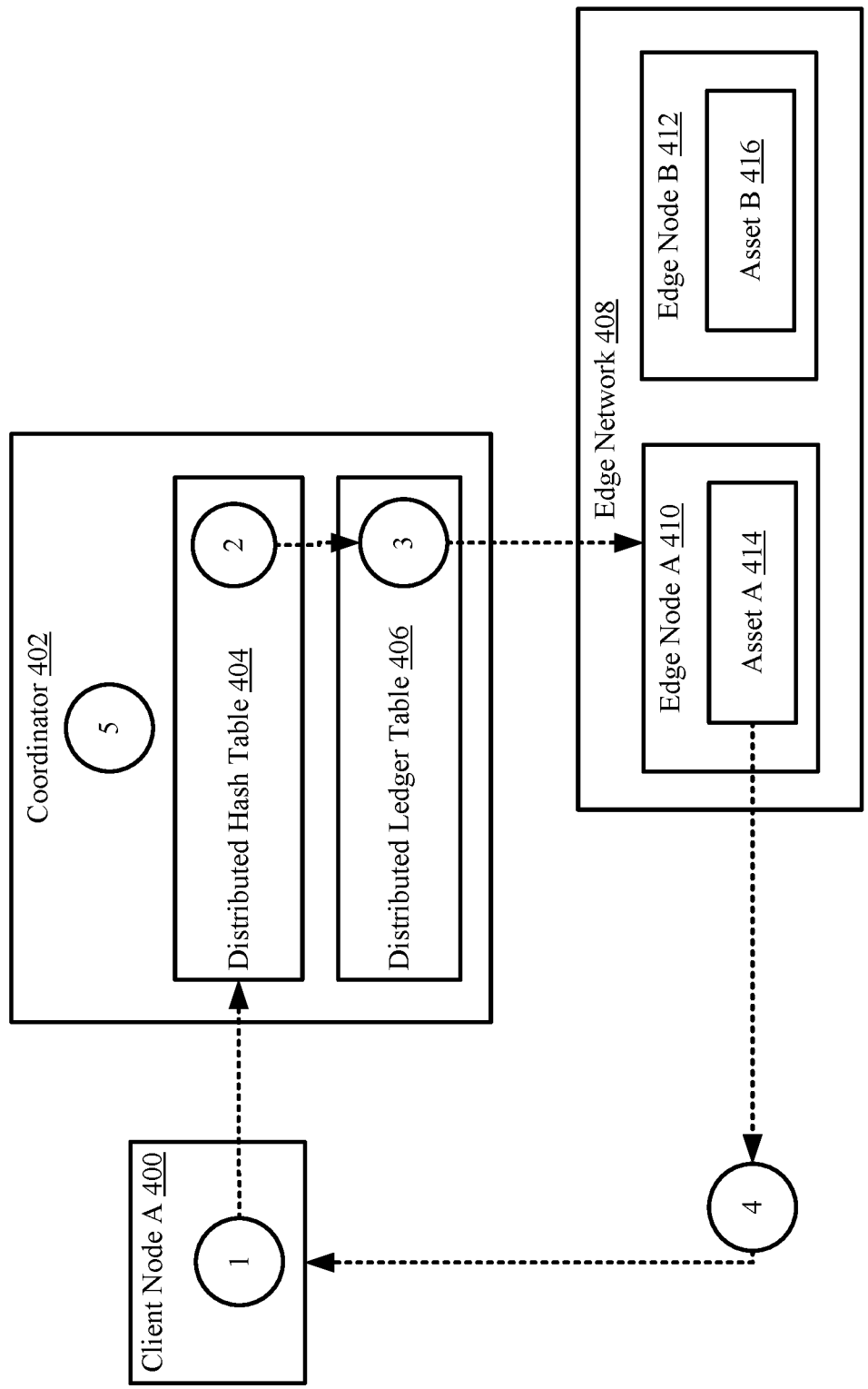
FIG. 4 shows a diagram of an example in accordance with one or more embodiments of the invention.

The following section describes an example. The example, illustrated in FIG. 4, is not intended to limit the invention. Turning to the example, consider a scenario in which a system includes a client node that requests a restoration of a specific version of a data asset.

Turning to FIG. 4, FIG. 4 shows a diagram of an example system. For the sake of brevity, not all components of the example system are illustrated in FIG. 4. The example system includes at least a client node A (400), a coordinator (402) containing a DHT (404) and DLT (406), and an edge network (408). The edge network (408) includes an edge node A (410) and an edge node B (412), which each contain a version of a data asset, asset A (414) and asset B (416). Other components in the system depicted in FIGS. 1A-1D may perform all, or a portion of the steps shown in FIG. 4 without departing from the scope of the invention.

In the following example, a sequence of operations illustrated in FIG. 4 as the circled numbers are described below using brackets.

In this methodology, a client node (400) initiates a data restoration request, specifying the need to restore a specific version of an asset, for example, asset A (414). This request is sent by the client node to a coordinator (402) [1]. The restoration request may be sent if the client node is experiencing data loss, is requiring data to complete a data process on the node, or a multitude of other reasons. Once the coordinator has received the data restoration request from the client node, it consults the DHT (404) [2]. By querying the DHT, the coordinator is able to identify where a desired version of the asset (414) is stored. In this example, the desired asset A (414) is stored in edge node A (410). If asset A is a frequently accessed asset by the client node (400), edge node A may have analyzed historical data operations and predictively cached asset A for easy access by client node A. In this example, the data restoration request for asset A from the client node may also be intentionally routed to edge node A in order to take advantage of locality to decrease latency when accessing backups of asset A (414).

When querying the DHT (404), the coordinator determines a storage location of the desired asset version based on the asset identifier of the asset version specified in the data restoration request. After identifying edge node A (410) as a storage location for asset A (414) as specified in the DHT, the coordinator (402) verifies that the identified asset is the desired version specified in the request by querying the DLT (406) [3]. Since the DLT contains metadata about every asset that has been backed up on the system, the client node (400) is able to verify via the coordinator (402) that the asset located in [2] is the desired version of asset A (414) specified in the data restoration request. Assets (414, 416) are verified using the DLT (406) using checksums, which ensure the integrity of the assets and confirm that they are not spoofed or malicious files pretending to be valid data assets. This verification process is done not only to ensure that the desired version of the data asset specified in the restoration request is located, but also to protect against malware in the form of spoofing attacks [3].

Once the identity and location of the desired data asset provided by the DHT (404) is verified by the coordinator (402) using the DLT (406), the data asset (414) is transferred from the edge node (410) to the client node (400) [4]. Assets cannot be transferred or restored unless the assets have been verified against the DLT. Once the transfer of data is complete, the DHT and DLT need to be updated. In order to maintain consistent logs of all data operations occurring on the system, the coordinator subsequently updates the DHT and DLT to reflect the new location of the asset [5]. Consistency checks are run periodically to ensure that all nodes, client (400) or edge (410, 412), have the latest, identical versions of assets (414, 416) according to the continuously updated DLT (406).

End of Example

As discussed above, embodiments of the invention may be implemented using computing devices. Turning now to FIG. 5, FIG. 5 shows a diagram of a computing device in accordance with one or more embodiments of the invention. The computer (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth® interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) (502) may be one or more cores or micro-cores of a processor. The computer (500) may also include one or more input devices (510), such as a touchscreen, keyboard, mouse, microphone, touchpad, electronic pen, or any other type of input device. Further, the communication interface (512) may include an integrated circuit for connecting the computer (500) to a network (not shown) (e.g., a local area network (LAN), a wide area network (WAN) such as the Internet, mobile network, or any other type of network) and/or to another device, such as another computing device.

In one embodiment of the invention, the computer (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many diverse types of computing devices exist, and the aforementioned input and output device(s) may take other forms.

One or more embodiments of the invention may be implemented using instructions executed by one or more processors of the system including a customer system, an edge network, and a coordinator. Further, such instructions may correspond to computer readable instructions that are stored on one or more non-transitory computer readable mediums.

One or more embodiments of the invention may improve the operation of one or more computing devices in a customer system. Specifically, embodiments of the invention relate to a system and method for data restoration using a decentralized backup and recovery system. This system utilizes distributed ledger technology, edge computing, and advanced security protocols to enable efficient, secure, and reliable data restoration across a range of assets including files, virtual machines (VM), volumes, and logical unit numbers (LUN). One or more embodiments improve upon the traditional method of data restoration, which traditionally uses a centralized system architecture. By using a plurality of edge nodes and distributed ledger technology to process data restoration requests, the embodiments disclosed herein improve upon the centralized architecture by removing the reliance on singular servers for restoration processes. The decentralized architecture disclosed herein decrease restoration time, increase data security, and improve overall system efficiency.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for restoring data on a client node in a network, the method comprising:
   receiving, by a first node and from the client node, a restoration request for a first version of a requested data asset;
   querying, by the first node, a distributed hash table (DHT) to identify a second node in a plurality of nodes storing a second version of the requested data asset;
   verifying, through a consistency check using a distributed ledger table (DLT), that the second version of the requested data asset stored on the second node matches the first version;
   initiating, based on the verifying, a data transfer of the second version of the requested data asset from the second node to the client node;
   monitoring after initiating the data transfer, by a coordinator, data processing requests occurring on the network;
   detecting, based on the monitoring and by the coordinator, a relocation of a data asset, wherein the relocation of the data asset is due to one of: a backup, a restoration, and a redistribution of workload; and
   updating the DHT and the DLT to reflect the relocation of the data asset, wherein updating the DHT and the DLT comprises adding or removing storage locations for the data asset and then performing the consistency check on the DHT and the DLT.

2. The method of claim 1, wherein the DHT comprises a plurality of entries for a plurality of data assets, wherein each entry of the plurality of entries comprises an asset identifier and a current storage location of one of the plurality of data assets.

3. The method of claim 1, wherein the DLT comprises a plurality of entries for a plurality of data assets, wherein each entry of the plurality of entries comprises metadata for a data asset of the plurality of data assets, wherein the metadata in each entry comprises an asset identifier of the data asset, a source node for the data asset, at least one storage location for the data asset, at least one timestamp of a modification made to the data asset, and at least one checksum for the data asset.

4. The method of claim 3, wherein a first entry of the plurality of entries corresponds to the first version of the requested data asset, and wherein a second entry corresponds to the second version of the requested data asset.

5. The method of claim 4, wherein the verifying through the consistency check comprises comparing checksums of the first and second entry.

6. The method of claim 3, wherein the plurality of entries in the DLT are immutable.

7. The method of claim 1, wherein the first node is a second client node and the second node is an edge node in an edge network.

8. The method of claim 1, wherein the first node and the second node are edge nodes in an edge network.

9. A system comprising:
a plurality of nodes on a network, comprising a client node, a first node, and a second node, wherein each node comprising a memory and at least one processor couple to the memory,
wherein the first node is programmed to:
receive, from the client node, a restoration request for a first version of a requested data asset;
query a distributed hash table (DHT) to identify the second node storing a second version of the requested data asset;
verify, using a through a consistency check using a distributed ledger table (DLT), that the second version of the requested data asset stored on the second node matches the first version;
initiate, based on the verification, a data transfer of the second version of the requested data asset from the second node to the client node;
monitor after initiating the data transfer, by a coordinator, data processing requests occurring on the network;
detect, based on the monitoring and by the coordinator, a relocation of a data asset, wherein the relocation of the data asset is due to one of: a backup, a restoration, and a redistribution of workload; and
update the DHT and the DLT to reflect the relocation of the data asset, wherein updating the DHT and the DLT comprises adding or removing storage locations for the data asset and then performing the consistency check on the DHT and the DLT.

10. The system of claim 9, wherein the DHT comprises a plurality of entries for a plurality of data assets, wherein each entry of the plurality of entries comprises an asset identifier and a current storage location of one of the plurality of data assets.

11. The system of claim 9, wherein the DLT comprises a plurality of entries for a plurality of data assets, wherein each entry of the plurality of entries comprises metadata for a data asset of the plurality of data assets, wherein the metadata in each entry comprises an asset identifier of the data asset, a source node for the data asset, at least one storage location for the data asset, at least one timestamp of a modification made to the data asset, and at least one checksum for the data asset.

12. The system of claim 11, wherein a first entry of the plurality of entries corresponds to the first version of the requested data asset, and wherein a second entry corresponds to the second version of the requested data asset.

13. The system of claim 12, wherein the verification comprises comparing checksums of the first and second entry.

14. The system of claim 11, wherein the plurality of entries in the DLT are immutable.

15. The system of claim 9, wherein the first node is a second client node and the second node is an edge node in an edge network.

16. The system of claim 9, wherein the first node and the second node are edge nodes in an edge network.

17. A non-transitory computer readable medium comprising computer readable program code, which when executed by a computer processor enables the computer processor to perform a method for restoring data in a client node on a network, the method comprising:
receiving, by a first node and from the client node, a restoration request for a first version of a requested data asset;
querying, by the first node, a distributed hash table (DHT) to identify a second node in a plurality of nodes storing a second version of the requested data asset;
verifying, through a consistency check using a distributed ledger table (DLT), that the second version of the requested data asset stored on the second node matches the first version;
initiating, based on the verifying, a data transfer of the second version of the requested data asset from the second node to the client node;
monitoring after initiating the data transfer, by a coordinator, data processing requests occurring on the network;
detecting, based on the monitoring and by the coordinator, a relocation of a data asset, wherein the relocation of the data asset is due to one of: a backup, a restoration, and a redistribution of workload; and
updating the DHT and the DLT to reflect the relocation of the data asset, wherein updating the DHT and the DLT comprises adding or removing storage locations for the data asset and then performing the consistency check on the DHT and the DLT.

18. The non-transitory computer readable medium of claim 17,
wherein the DHT comprises a first plurality of entries for a plurality of data assets,
wherein each entry of the first plurality of entries comprises an asset identifier and a current storage location of one of the plurality of data assets,
wherein the DLT comprises a second plurality of entries for the plurality of data assets,
wherein each entry of the second plurality of entries comprises metadata for a data asset of the plurality of data assets, and
wherein the metadata in each entry of the second plurality of entries comprises an asset identifier of the data asset, a source node for the data asset, at least one storage location for the data asset, at least one timestamp of a modification made to the data asset, and at least one checksum for the data asset.

* * * * *